US 12,531,757 B2

(12) United States Patent
Tsuruzono

(10) Patent No.: US 12,531,757 B2
(45) Date of Patent: Jan. 20, 2026

(54) DELIVERY SERVER AND DELIVERY METHOD

(71) Applicant: Sharp NEC Display Solutions, Ltd., Tokyo (JP)

(72) Inventor: Kengo Tsuruzono, Tokyo (JP)

(73) Assignee: Sharp Display Solutions, Ltd., Tokyo (JP)

( * ) Notice: Subject to any disclaimer, the term of this patent is extended or adjusted under 35 U.S.C. 154(b) by 26 days.

(21) Appl. No.: 18/394,584

(22) Filed: Dec. 22, 2023

(65) Prior Publication Data

US 2024/0137238 A1 Apr. 25, 2024

Related U.S. Application Data

(63) Continuation of application No. PCT/JP2021/026127, filed on Jul. 12, 2021.

(51) Int. Cl.
*H04L 12/18* (2006.01)
(52) U.S. Cl.
CPC ...... *H04L 12/1831* (2013.01); *H04L 12/1822* (2013.01)
(58) Field of Classification Search
CPC .................. H04L 12/1831; H04L 12/1822
(Continued)

(56) References Cited

U.S. PATENT DOCUMENTS

2013/0139060 A1* 5/2013 Chae .................. H04N 21/4788 715/719
2017/0070779 A1* 3/2017 Kim .................. H04N 21/8549
(Continued)

FOREIGN PATENT DOCUMENTS

JP H 07-064907 A 3/1995
JP 2001-202315 A 7/2001
(Continued)

OTHER PUBLICATIONS

International Search Report in PCT/JP2021/026127 dated Sep. 21, 2021 with English translation hereof.

*Primary Examiner* — Suraj M Joshi
*Assistant Examiner* — Ayele F Woldemariam
(74) *Attorney, Agent, or Firm* — McGinn I.P.Law Group, PLLC

(57) ABSTRACT

A delivery server delivering first content to a plurality of information processing terminals includes: an acquisition unit configured to acquire response information indicating a response to the first content from the plurality of information processing terminals; a generation unit configured to generate reaction information for reflecting the response in the first content on the basis of the response information; and a delivery unit configured to deliver the reaction information or second content in which the reaction information is reflected in the first content to the plurality of information processing terminals. The response information includes information indicating a reproduction time of target content to which the response has been made in the first content and a response target to which the response has been made in the target content. The generation unit identifies the target content and the response target on the basis of the response information and generates information for reflecting the response in the reaction target in the identified target content as the reaction information.

9 Claims, 11 Drawing Sheets

(58) Field of Classification Search
USPC .......................................................... 709/204
See application file for complete search history.

(56) References Cited

U.S. PATENT DOCUMENTS

| | | | |
|---|---|---|---|
| 2018/0048823 A1* | 2/2018 | Kang | H04N 13/239 |
| 2020/0201512 A1* | 6/2020 | Faulkner | H04L 12/1827 |
| 2021/0399911 A1* | 12/2021 | Jorasch | H04L 12/1818 |

FOREIGN PATENT DOCUMENTS

| | | | | |
|---|---|---|---|---|
| JP | 2011-081639 A | 4/2011 | | |
| JP | 2017-055393 A | 3/2017 | | |
| JP | 2019-179314 A | 10/2019 | | |
| JP | 2020-500343 A | 1/2020 | | |
| WO | WO-2018122642 A1 * | 7/2018 | ........... | G06F 3/0482 |

* cited by examiner

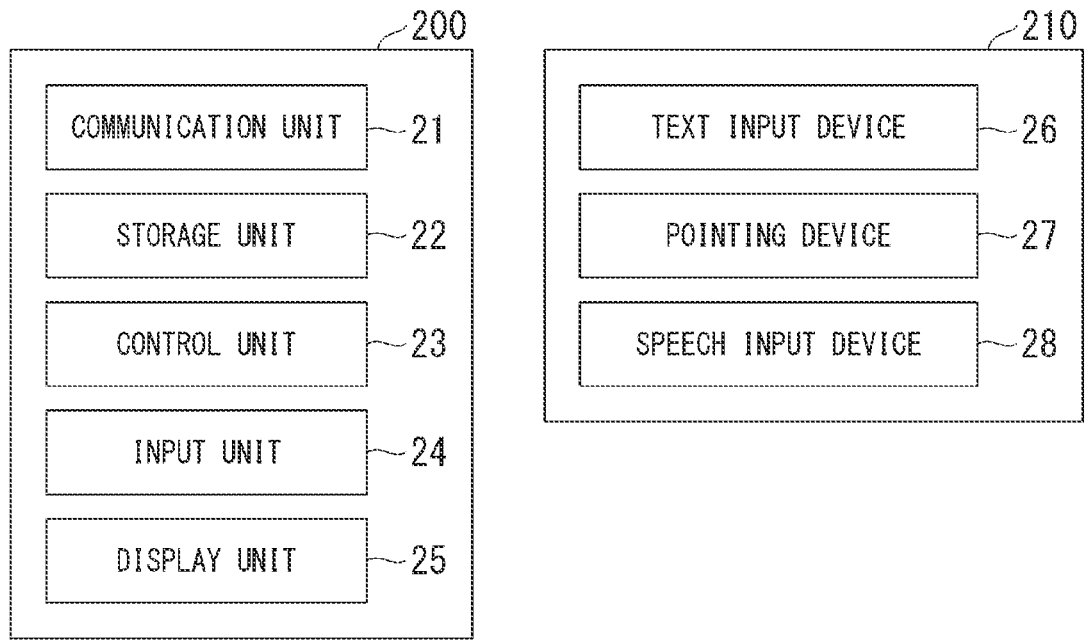

FIG. 6

| VIDEO REACTION ID | |
|---|---|
| TIME | |
| COORDINATES | |
| TYPE | |
| CONSENT COUNT | |
| COMMENT LIST | |

FIG. 7

| SPEECH TEXT REACTION ID | |
|---|---|
| TIME | |
| POSITION | |
| TYPE | |
| CONSENT COUNT | |
| COMMENT LIST | |

FIG. 8

[Figure showing a display layout with regions labeled 25, 250, 251, 252, 253, R-1, R-2, containing Japanese text about USB 2.0 and USB 3.0 specifications, a timeline (00:00–04:00) with CURRENT marker, and a comment table with columns TYPE, COMMENT, CONSENT including entries "? THERE IS QUESTION ▽ I WANT TO HEAR MORE SPECIFIC EXAMPLE" (1), "? THERE IS QUESTION ▽ NO PROBLEM HAS OCCURRED ACTUALLY…" (3), "! THERE IS OPINION ▽ SPEED DOES NOT REACH IT ACTUALLY…" (2).]

FIG. 11

| ? THERE IS QUESTION ▽ |
| --- |
| ? THERE IS QUESTION |
| ! THERE IS OPINION |
| △ APPROVAL |
| ▽ OBJECTION |

FIG. 12

| ? THERE IS QUESTION▽ | HAS NO PROBLEM OCCURRED ACTUALLY? | 3 | + |
| --- | --- | --- | --- |
| ! THERE IS OPINION▽ | "ANSWER" | 2 | + |
| | ANSWER: THERE WERE PRODUCTS WITH PROBLEM INITIALLY  "ANSWER" | | |

| | QUESTIONAIRE DETAILS |
|---|---|
| Q1 | I KNOW |
| Q2 | I KNOW ONLY NAME |
| Q3 | I DO NOT KNOW |
| Q4 | |
| Q5 | |
| Q6 | |

QUESTIONAIRE

[ CANCEL ]  [ PASTE ]

DELIVERY SERVER AND DELIVERY METHOD

TECHNICAL FIELD

The present invention relates to a delivery server and a delivery method.

BACKGROUND ART

Online communication of transmitting and receiving images, speech, or the like via a communication network has been realized. Patent Documents 1 to 3 disclose techniques of presenting a response of a participant to details which are announced online.

CITATION LIST

Patent Document

[Patent Document 1]
  Japanese Unexamined Patent Application, First Publication No. 2001-202315
[Patent Document 2]
  Japanese Unexamined Patent Application, First Publication No. 2011-081639
[Patent Document 3]
  Japanese Unexamined Patent Application, First Publication No. H07-064907

SUMMARY OF INVENTION

Technical Problem

This online communication tool may be applied to conferences or seminars. In conferences or seminars, there is a need to arrange details of announcements according to responses from participants and thus there is demand for a technique of enabling accurate ascertainment of responses from participants. In this regard, there is room for improvement in the related art.

In consideration of the aforementioned circumstances, an objective of the present invention is to provide a delivery server and a delivery method that can accurately represent a response from a participant.

Solution to Problem

According to an aspect of the present invention, there is provided a delivery server delivering first content to a plurality of information processing terminals, the delivery server including: an acquisition unit configured to acquire response information indicating a response to the first content from the plurality of information processing terminals; a generation unit configured to generate reaction information for reflecting the response in the first content on the basis of the response information; and a delivery unit configured to deliver the reaction information or second content in which the reaction information is reflected in the first content to the plurality of information processing terminals, wherein the response information includes information indicating a reproduction time of target content to which the response has been made in the first content and a response target to which the response has been made in the target content, and the generation unit identifies the target content and the response target on the basis of the response information and generates information for reflecting the response in the reaction target in the identified target content as the reaction information.

According to another aspect of the present invention, there is provided a delivery server delivering first content to a plurality of information processing terminals, the delivery server including: an acquisition unit configured to acquire response information indicating a response to the first content from the plurality of information processing terminals; a generation unit configured to generate reaction information for reflecting the response in the first content on the basis of the response information; and a delivery unit configured to deliver the reaction information or second content in which the reaction information is reflected in the first content to the plurality of information processing terminals, wherein the response information includes information indicating a response to an existing response already made to target content to which the response has been made in the first content, and the generation unit generates information for reflecting the existing response and the response to the existing response in the target content as the reaction information.

According to another aspect of the present invention, there is provided a delivery method that is performed by a delivery server delivering first content to a plurality of information processing terminals, the delivery method including: causing an acquisition unit to acquire response information indicating a response to the first content from the plurality of information processing terminals; causing a generation unit to generate reaction information for reflecting the response in the first content on the basis of the response information; and causing a delivery unit to deliver the reaction information or second content in which the reaction information is reflected in the first content to the plurality of information processing terminals, wherein the response information includes information indicating a reproduction time of target content to which the response has been made in the first content and a response target to which the response has been made in the target content, and the generation unit identifies the target content and the response target on the basis of the response information and generates information for reflecting the response in the reaction target in the identified target content as the reaction information.

According to another aspect of the present invention, there is provided a delivery server delivering first content to a plurality of information processing terminals, the delivery method including: causing an acquisition unit to acquire response information indicating a response to the first content from the plurality of information processing terminals; causing a generation unit to generate reaction information for reflecting the response in the first content on the basis of the response information; and causing a delivery unit to deliver the reaction information or second content in which the reaction information is reflected in the first content to the plurality of information processing terminals, wherein the response information includes information indicating a response to an existing response already made to target content to which the response has been made in the first content, and the generation unit generates information for reflecting the existing response and the response to the existing response in the target content as the reaction information.

Advantageous Effects of Invention

As described above, according to the present invention, it is possible to accurately represent a response from a participant.

BRIEF DESCRIPTION OF DRAWINGS

FIG. 3 is a diagram illustrating an example of a configuration of a speaker terminal 20 (a participant terminal 30) according to the first embodiment.

FIG. 4 is a diagram illustrating an example of a configuration of conference video information 120 according to the first embodiment.

FIG. 5 is a diagram illustrating an example of a configuration of speech text information 121 according to the first embodiment.

FIG. 6 is a diagram illustrating an example of a configuration of conference video reaction information 122 according to the first embodiment.

FIG. 7 is a diagram illustrating an example of a configuration of speech text reaction information 123 according to the first embodiment.

FIG. 8 is a diagram illustrating an example of an image which is displayed on a display unit 25 according to the first embodiment.

FIG. 11 is a diagram illustrating an example of an image which is displayed on the display unit 25 according to the first embodiment.

FIG. 12 is a diagram illustrating an example of an image which is displayed on the display unit 25 according to the first embodiment.

DESCRIPTION OF EMBODIMENTS

Hereinafter, a conference system 1 according to an embodiment of the present invention will be described with reference to the accompanying drawings.

Figure 1:
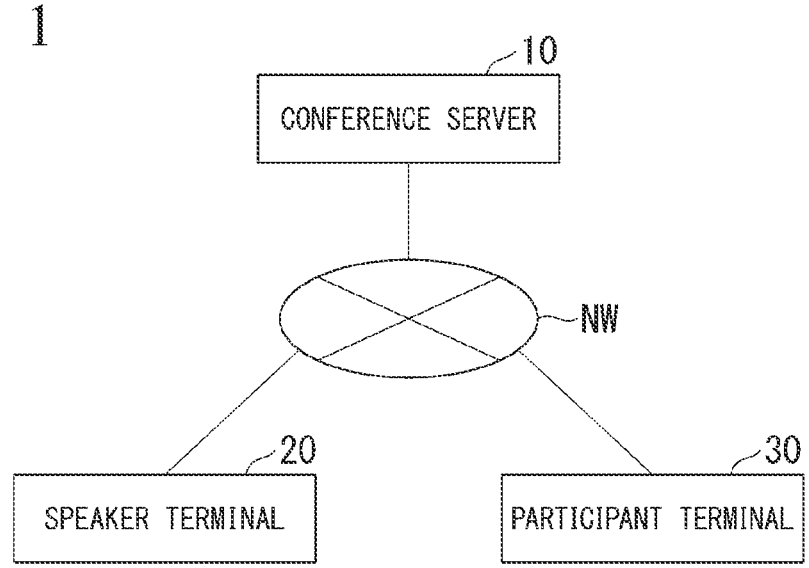
FIG. 1 is a block diagram illustrating an example of a configuration of a conference system 1 according to a first embodiment.

FIG. 1 is a block diagram illustrating an example of a configuration of a conference system 1 according to a first embodiment. The conference system 1 includes, for example, a conference server 10, a speaker terminal 20, and a participant terminal 30. The conference server 10 is an example of a "delivery server." The speaker terminal 20 is an example of an "information processing terminal." The participant terminal 30 is an example of an "information processing terminal."

In the conference system 1, the conference server 10, the speaker terminal 20, and the participant terminal 30 are communicatively connected to each other via a communication network NW. In the example illustrated in the drawing, it is assumed that the conference system 1 includes one speaker terminal 20 and one participant terminal 30. However, the present invention is not limited thereto. The conference system 1 may include a plurality of speaker terminals 20. The conference system 1 may include a plurality of participant terminals 30. Various processes which are performed by the conference server 10 may be realized by a plurality of server devices.

The conference server 10 is a computer device that realizes an online conference. The conference server 10 is realized, for example, by a server device, a cloud device, or a personal computer (PC).

The speaker terminal 20 is a computer device serving as a speaker in an online conference. The speaker terminal 20 is realized, for example, by a PC, a smartphone, a tablet terminal, or a mobile phone.

The participant terminal 30 is a computer device serving as a participant in an online conference. The participant terminal 30 is realized, for example, by a PC, a smartphone, a tablet terminal, or a mobile phone.

The conference server 10 delivers a conference video which is provided by the speaker terminal 20 to the speaker terminal 20 and the participant terminal 30. Accordingly, the conference video is displayed on the speaker terminal 20 and the participant terminal 30. The conference video is an example of a "delivery image."

The conference server 10 delivers speech text indicating text information in which speech uttered from the speaker terminal 20 (hereinafter also referred to as uttered speech) is converted to text to the speaker terminal 20 and the participant terminal 30. Accordingly, speech text is displayed on the speaker terminal 20 and the participant terminal 30. The speech text is an example of a "delivery image."

In this case, the conference server 10 may deliver the uttered speech to the speaker terminal 20 and the participant terminal 30. In this case, the uttered speech is output from the speaker terminal 20 and the participant terminal 30.

The conference server 10 generates a reaction image. The reaction image is an image in which a response of a participant to speech details (one or both of a conference video and speech text) is reflected. A response of another participant to the response of the participant made to the speech details may be reflected in the reaction image. A method used to for the conference server 10 to generate a reaction image will be described later in detail.

The conference server 10 delivers the generated reaction image to the speaker terminal 20 and the participant terminal 30. Accordingly, the reaction image is displayed on the speaker terminal 20 and the participant terminal 30, and the speaker of the speaker terminal 20 and the participant of the participant terminal 30 can ascertain what response to the speech details has been made. The reaction image is an example of a "delivery image."

Figure 2:
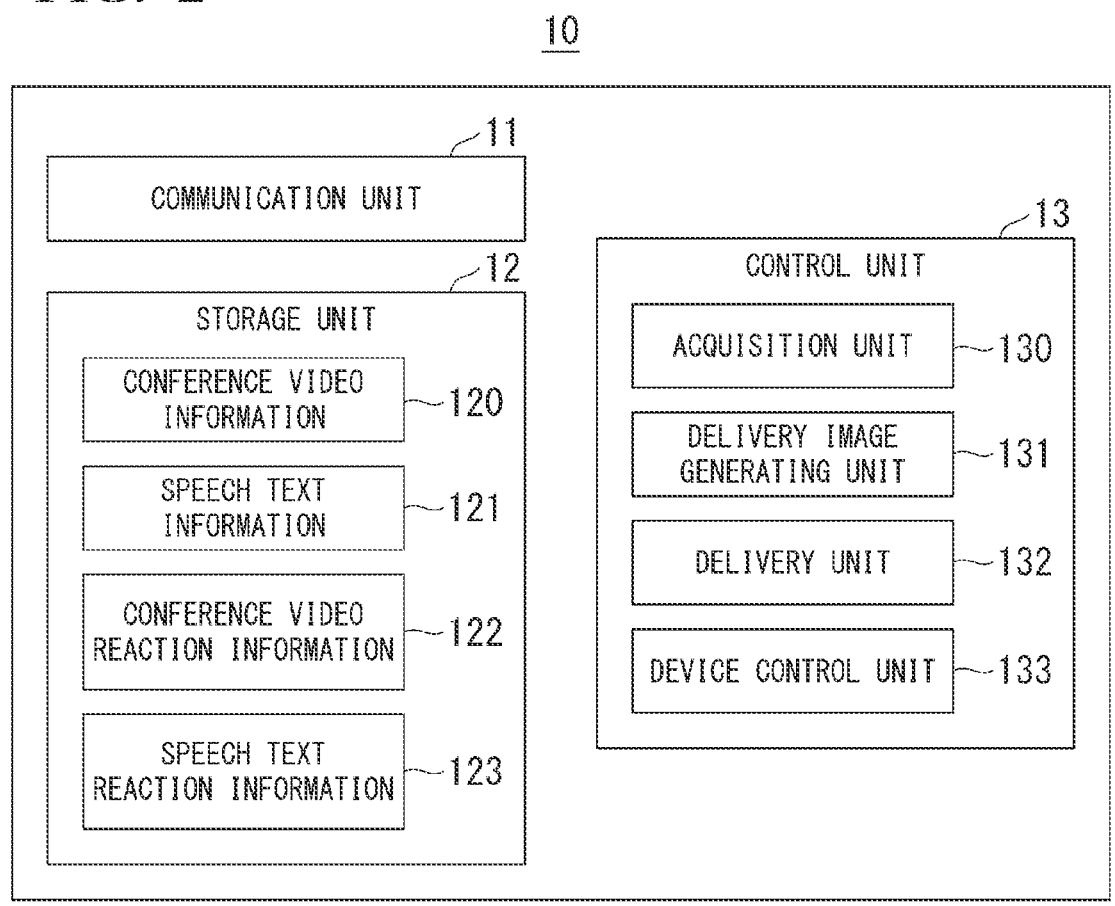
FIG. 2 is a block diagram illustrating an example of a configuration of a conference server 10 according to the first embodiment.

FIG. 2 is a block diagram illustrating an example of a configuration of the conference server 10 according to the first embodiment. The conference server 10 includes, for example, a communication unit 11, a storage unit 12, and a control unit 13. The communication unit 11 communicates with the speaker terminal 20 and the participant terminal 30.

The storage unit 12 is constituted by a storage medium such as a hard disk drive (HDD), a flash memory, an electrically erasable programmable read only memory (EEPROM), a random access read/write memory (RAM), or a read only memory (ROM) or a combination of the storage media. The storage unit 12 stores programs for performing various processes of the conference server 10 and temporary data used to perform various processes.

The storage unit 12 stores, for example, conference video information 120, speech text information 121, conference video reaction information 122, and speech text reaction information 123. The speech text information 121, the conference video reaction information 122, and the speech text reaction information 123 will be described below with reference to FIGS. 4 to 7.

FIG. 4 is a diagram illustrating an example of a configuration of the conference video information 120 according to the first embodiment. The conference video information 120 is a conference video which is provided by a speaker in an online conference, for example, presentation data. The conference video information 120 is stored in the storage unit 12 in advance, for example, via the speaker terminal 20 or a Universal Serial Bus (USB) memory. The conference video information 120 is generated, for example, for each image included in the conference video and is sequentially delivered according to a reproduction time thereof.

As illustrated in FIG. 4, the conference video information 120 includes fields of image ID, image, time, and the like. The image ID is identification information such as a number for uniquely identifying an image included in the conference video. The image is image information of the image which is identified by the image ID. The time is information indicating a time (a reproduction time) at which the image identified by the image ID is reproduced.

FIG. 5 is a diagram illustrating an example of a configuration of the speech text information 121 according to the first embodiment. The speech text information 121 is text information in which speech uttered by a speaker in an online conference is converted to text. Regarding the speech text information 121, for example, speech of a speaker transmitted via the speaker terminal 20 is converted to text using speech recognition technology, and the text information is stored in the storage unit 12. The speech text information 121 is generated, for example, for each utterance uttered while the delivered conference video is being displayed on the speaker terminal 20 or the participant terminal 30 and is sequentially delivered according to the reproduction time of the corresponding image.

As illustrated in FIG. 5, the speech text information 121 includes fields of speech ID, uttered speech, speech text, time, and the like. The speech ID is identification information such as a number for uniquely identifying speech uttered to correspond to the conference video. The uttered speech is information indicating speech identified by the speech ID. The speech text is text information in which the speech identified by the speech ID is converted to text. The time is information indicating the reproduction time of the conference video corresponding to the speech text identified by the speech ID.

FIG. 6 is a diagram illustrating an example of a configuration of the conference video reaction information 122 according to the first embodiment. The conference video reaction information 122 is information indicating a response (a reaction) of a participant to the delivered conference video. The conference video reaction information 122 is generated on the basis of information indicating a response to the conference video and transmitted from the participant terminal 30.

As illustrated in FIG. 6, the conference video reaction information 122 includes, for example, fields of video reaction ID, time, coordinates, type, consent count, comment list, and the like. The video reaction ID is identified information such as a number for uniquely identifying a response made to the conference video. The time is information indicating a reproduction time of an image of the conference video to which the response has been made. The coordinates are information indicating position coordinates in which a response has been made in an image of the conference video to which the response has been made.

The type is information indicating a type of the response identified by the video reaction ID. The type is, for example, information indicating which of a question, an opinion, a request, an impression, an approval, and an objection the response is.

The consent count is information indicating the number of consents from other participants to the response identified by the video reaction ID.

The comment list is information in which details to be delivered as a response by a questioner to the response identified by the video reaction ID are expressed in text.

FIG. 7 is a diagram illustrating an example of a configuration of the speech text reaction information 123 according to the first embodiment. The speech text reaction information 123 is information indicating a response (a reaction) of a participant to the delivered speech text. The speech text reaction information 123 is generated on the basis of information indicating a response to the conference video which is transmitted from the participant terminal 30.

As illustrated in FIG. 7, the speech text reaction information 123 includes, for example, fields of speech text reaction ID, time, position, type, consent count, and commend list. The speech text reaction ID is identification information such as a number for uniquely identifying a response to speech text. The time is information indicating a reproduction time of an image in the conference video corresponding to the speech text to which the response has been made. The position is information indicating a character or a character string to which a response has made in the speech text to which the response has been made.

The type is information indicating a type of the response identified by the speech text reaction ID. The type is, for example, information indicating which of a question, an opinion, a request, an impression, an approval, and an objection the response is.

The consent count is information indicating the number of consents from other participants to the response identified by the speech text reaction ID.

The comment list is information in which specific details, which are to be transmitted as a response by a questioner, of the response identified by the speech text reaction ID are expressed as a character string.

Referring back to FIG. 2, the control unit 13 is realized by causing a central processing unit (CPU) provided as hardware in the conference server 10 to execute a program. The control unit 13 comprehensively controls the conference server 10. The control unit 13 includes, for example, an acquisition unit 130, a delivery video generating unit 131, a delivery unit 132, and a device control unit 133.

The acquisition unit 130 acquires information indicating a response acquired from the participant terminal 30 via the communication unit 11. The acquisition unit 130 acquires, for example, information indicating whether a response target is a conference video or speech text, information (consent information) indicating whether to consent to a previous response (an existing response), information indicating a type of a response, and a comment input by a participant exhibiting the response. The acquisition unit 130 generates reaction information (the conference video reaction information 122 or the speech text reaction information 123) on the basis of the acquired information. The acquisition unit 130 stores the generated reaction information in the storage unit 12.

The delivery video generating unit 131 generates an image to be delivered. When reaction information (the conference video reaction information 122 or the speech text reaction information 123) is not generated, the delivery video generating unit 131 generates the conference video and an image including speech text as the image to be delivered on the basis of the conference video information 120 and the speech text information 121.

When reaction information (the conference video reaction information 122 or the speech text reaction information 123) is generated, the delivery video generating unit 131 generates a reaction image on the basis of the generated reaction information. A method used for the delivery video generating unit 131 to generate the reaction image will be described later in detail.

The delivery unit 132 delivers the image generated by the delivery video generating unit 131. For example, the delivery unit 132 sequentially delivers an image (a conference video and an image including speech text) to which a response has not been made yet according to a reproduction time thereof. The delivery unit 132 delivers a reaction image when the reaction image is generated by the delivery video generating unit 131. Accordingly, when participants make a response in an online conference, a speaker or participants can ascertain the response acquired from the participants in the conference in real time.

The device control unit 133 comprehensively controls the conference server 10. For example, the device control unit 133 prepares text information in which speech of a speaker received from the speaker terminal 20 by the communication unit 11 is converted to text and stores the generated information in the speech text information 121.

FIG. 3 is a diagram illustrating an example of a configuration of a speaker terminal 20 (a participant terminal 30) according to the first embodiment. The speaker terminal 20 and the participant terminal 30 can employ the same configuration as a terminal participating in the online conference. In the following description, the configuration of the speaker terminal 20 will be described, and description of the participant terminal 30 which is the same as the speaker terminal 20 will be omitted.

The speaker terminal 20 includes, for example, an information processing device 200 and an input device group 210. The information processing device 200 is a computer device that is realized by a PC or the like. The information processing device 200 includes, for example, a communication unit 21, a storage unit 22, a control unit 23, an input unit 24, and a display unit 25.

The communication unit 21 communicates with the conference server 10. The storage unit 22 is constituted by a storage medium such as an HDD, a flash memory, an EEPROM, a RAM, or a ROM or a combination of the storage media. The storage unit 22 stores programs for performing various processes of the speaker terminal 20 and temporary data used to perform various processes. The control unit 23 is realized by causing a CPU provided as hardware in the speaker terminal 20 to execute a program.

The control unit 23 comprehensively controls the speaker terminal 20. The control unit 23 displays, for example, an image delivered from the conference server 10 on the display unit 25. The control unit 23 acquires speech of a speaker input to the speech input device 28 via the input unit 24 and transmits the acquired speech to the conference server 10. In the participant terminal 30, the control unit 33 transmits information indicating a response of a participant to the conference server 10.

The input unit 24 acquires information on an input operation from a speaker, a participant, or the like (hereinafter referred to as a user) and information indicating speech uttered by the user from the input device group 210 and outputs the acquired information to the control unit 23. The display unit 25 includes a liquid crystal display and displays an image delivered from the conference server 10 under the control of the control unit 23.

The input device group 210 includes, for example, a text input device 26, a pointing device 27, and a speech input device 28. The text input device 26 is a character input device such as a keyboard. The text input device 26 acquires character information such as characters or symbols input through a user's input operation and outputs the acquired information to the input unit 24. The pointing device 27 is an input device such as a mouse. The pointing device 27 outputs information indicating a position on a screen designated through a user's operation or the like to the input unit 24. The speech input device 28 is a microphone or the like, acquires speech uttered by a user, and outputs information obtained by converting the acquired speech to an electrical signal to the input unit 24.

A reaction image will be described below with reference to FIGS. 8 to 12. An example of a reaction image displayed on the speaker terminal 20 or the participant terminal 30 is illustrated in FIGS. 8 to 12.

As illustrated in FIG. 8, the reaction image includes, for example, a conference video display area 250, a speech text display area 251, a seek bar display area 252, and a reaction display area 253. The conference video display area 250 is an area in which a conference video is displayed. The speech text display area 251 is an area in which speech text is displayed. The seek bar display area 252 is an area in which a current reproduction position in reproduction of a conference video carried out in an online conference is displayed. The reaction display area 253 is an area in which a participant's reaction is displayed.

In the conference video display area 250, a reaction icon R-1 is displayed at a place at which a response of a participant has been made in the conference video. In the speech text display area 251, a reaction icon R-2 is displayed at a place at which a response of a participant has been made in the speech text.

Figure 9:
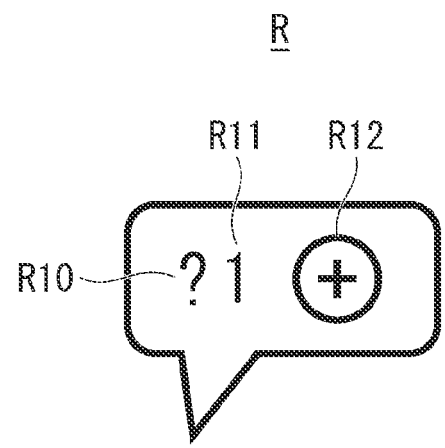
FIG. 9 is a diagram illustrating an example of an image which is displayed on the display unit 25 according to the first embodiment.

An example of a reaction icon R is illustrated in FIG. 9. As illustrated in FIG. 9, the reaction icon R includes, for example, a type symbol R10, a consent count R11, and a consent button R12. The type symbol R10 is a symbol indicating a response type, and a question mark (?) indicates that the response type is "question." The consent count R11 indicates the number of participants having consented to the reaction icon R. The consent button R12 is an operation button. When the consent button R12 is clicked by a participant, information indicating consent (consent information) is transmitted from the participant terminal 30 to the conference server 10.

Figure 10:
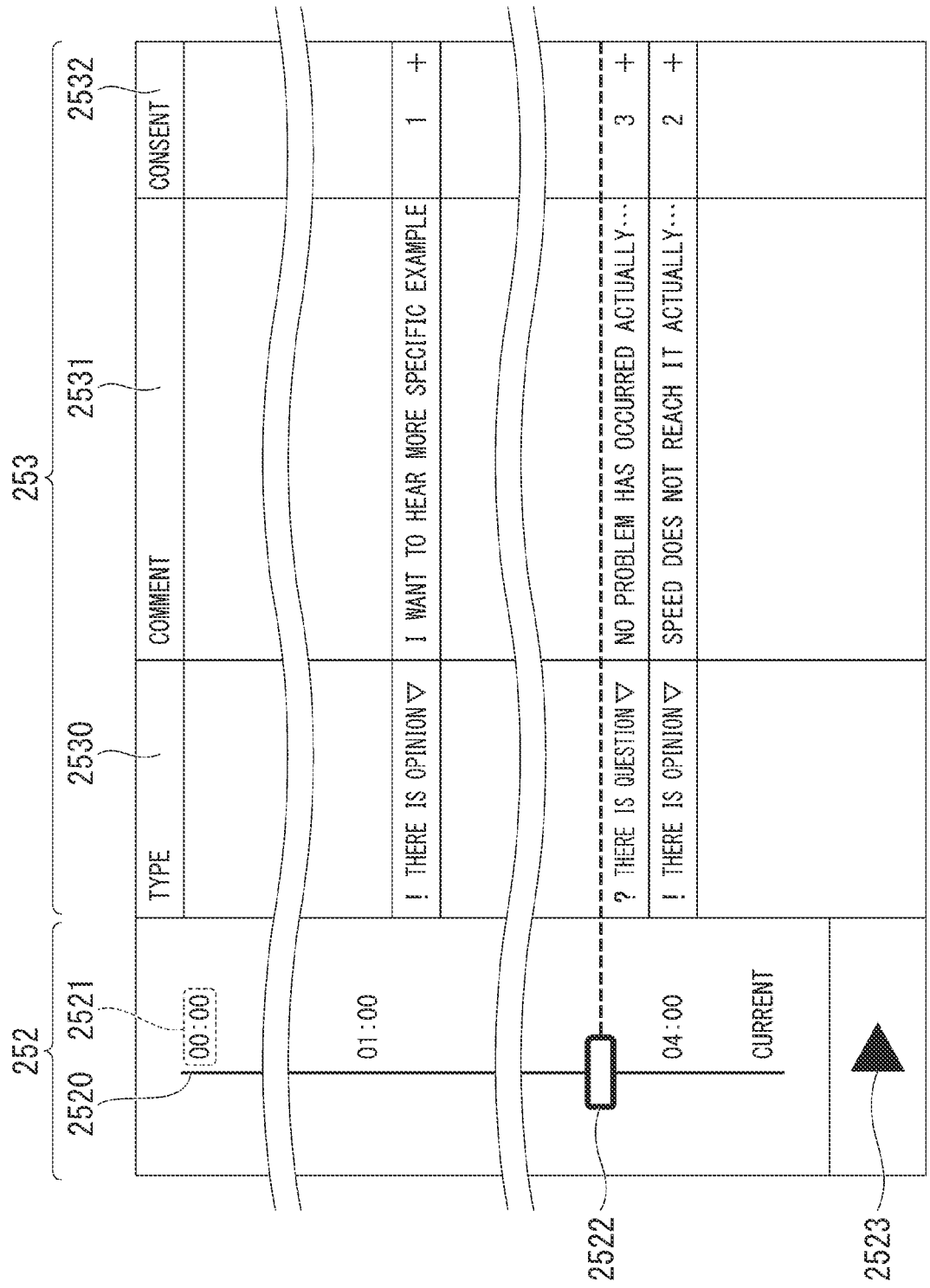
FIG. 10 is a diagram illustrating an example of an image which is displayed on the display unit 25 according to the first embodiment.

FIG. 10 illustrates an example in which the seek bar display area 252 and the reaction display area 253 are enlarged. As illustrated in FIG. 10, a time indication 2521 is displayed along a time indication bar 2520 in the seek bar display area 252.

When a controller 2522 is operated to slide along the time indication bar 2520, an arbitrary reproduction time from start of reproduction to the current time can be set. An image of the conference video corresponding to the reproduction time set with the controller 2522 is displayed in the conference video display area 250. The speech text corresponding to the reproduction time set with the controller 2522 is displayed in the speech text display area 251. When the reproduction button 2523 is clicked, reproduction of the conference video displayed in the conference video display area 250 is started or stopped, and the speech text is displayed in the speech text display area 251 with the starting or stopping of the conference video.

In the reaction display area 253, a response acquired for an image (an image indicating the conference video or the speech text) is displayed in correlation with a reproduction time of the image. The reaction display area 253 includes, for example, items such as a field of type 2530, a field of comment 2531, and a field of consent 2532. A type of response is displayed in the field of type 2530. A comment input by a responding participant is displayed in the field of comment 2531. The number of consents acquired for the response is displayed in the field of consent 2532.

FIG. 11 illustrates an example of a selection screen for selecting a type of response. For example, when a participant clicks a place to which the participant wants to respond in the image (the image indicating the conference video or the speech text), the selection screen illustrated in FIG. 11 is displayed.

A type of response selected by the participant is displayed in the upper field of FIG. 11. Candidates for the type of response settable are displayed in fields other than the upper field of FIG. 11. When a participant clicks a type of response selected from the candidates for the type of response displayed in the fields other than the upper field, the selected type of response is displayed in the upper field.

FIG. 12 illustrates a display example when the field of comment 2531 is clicked. In a state in which the field of comment 2531 has not been clicked, only a first row of the comment acquired from a participant is displayed in the field of comment 2531. When the field of comment 2531 is clicked, the whole comment acquired from the participant is displayed. When a field of "answer" in the displayed comment is clicked, a field of answer to the comment is displayed and thus an answer to the comment can be input.

Figure 13:
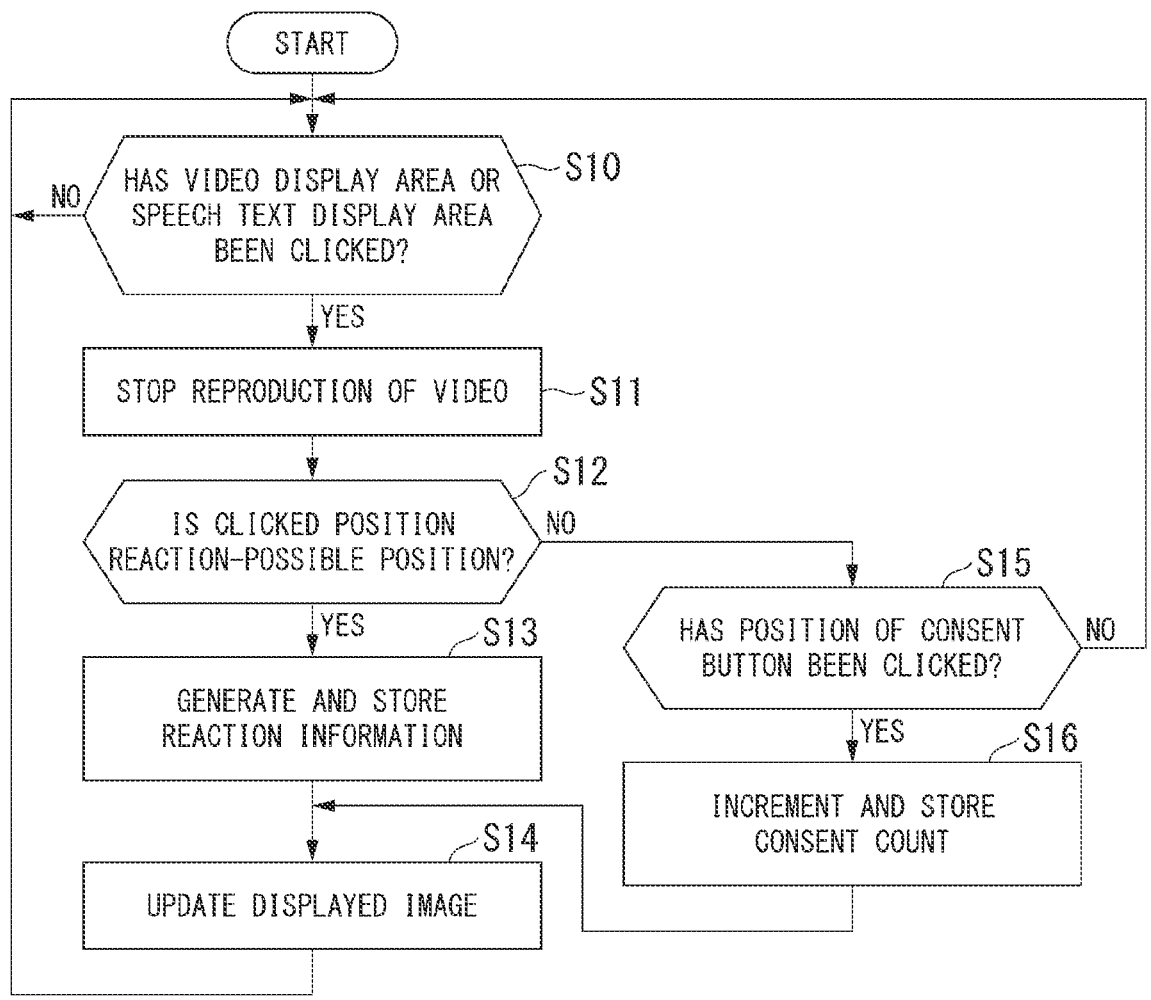
FIG. 13 is a flowchart illustrating a flow of processes which are performed by the conference server 10 according to the first embodiment.
Figure 14:
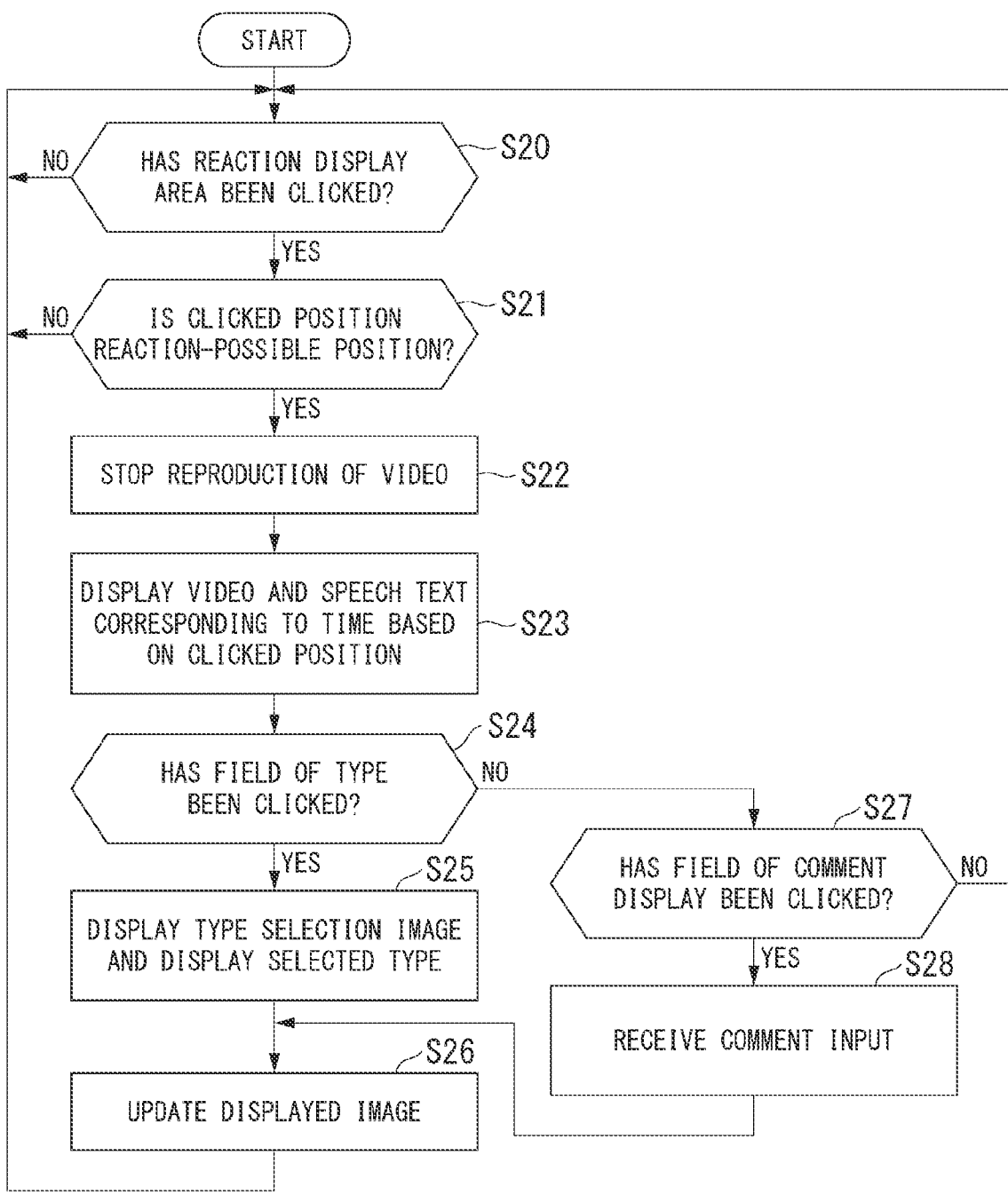
FIG. 14 is a flowchart illustrating a flow of processes which are performed by the conference server 10 according to the first embodiment.

A method of generating a reaction image will be described below with reference to FIGS. 13 and 14. FIGS. 13 and 14 are flowcharts illustrating a flow of processes which are performed by the conference server 10 according to the first embodiment.

The premise of the flows illustrated in FIGS. 13 and 14 will be first described. A participant performs an operation of returning a response when the participant gets a question, a doubt, or the like by seeing an image (an image indicating a conference video or speech text) displayed on the screen of the participant terminal 30 or hearing speech from a speaker. Specifically, when a participant of the participant terminal 30 makes a response to the conference video, the participant clicks a place at which an image to which a response is to be made in the conference video display area 250 displayed on the screen is displayed. When the participant makes a response to speech, the participant clicks a place at which a character string to which the participant is to make a response in the speech text display area 251 displayed on the screen is displayed. When the screen of the participant terminal 30 is clicked by the participant, information indicating the clicking operation is transmitted from the participant terminal 30 to the conference server 10. The information indicating the clicking operation includes, for example, information for identifying an image displayed when the clicking operation has been performed and information indicating the clicked position.

FIG. 13 illustrates a flow of processes which are performed when the conference video display area 250 or the speech text display area 251 is clicked. FIG. 14 illustrates a flow of processes which are performed when the reaction display area 253 is clicked.

The flow illustrated in FIG. 13 will be first described. The conference server 10 determines whether the conference video display area 250 or the speech text display area 251 of the participant terminal 30 has been clicked (Step S10). When the conference video display area 250 or the speech text display area 251 has been clicked, the conference server 10 stops reproduction of a video in the participant terminal 30 (Step S11). The conference server 10 determines whether the clicked position is a reaction-possible position (Step S12). The reaction-possible position is, for example, a part in which an image of a conference video is displayed in the conference video display area 250 or a part in which a character string of speech text is displayed in the speech text display area 251. The reaction-possible position is a position other than a position to which a response has been made and is a part in which the reaction icon R is not displayed in the conference video display area 250 and the speech text display area 251.

When the clicked position is a reaction-possible position, the conference server 10 generates and stores reaction information (Step S13). The reaction information is the conference video reaction information 122 or the speech text reaction information 123.

In this case, for example, the conference server 10 displays the selection screen illustrated in FIG. 11 on the participant terminal 30 as a response to the clicking operation. The participant performs an operation of selecting a type of response on the selection screen and performs a transmitting operation. Accordingly, the type of response is transmitted from the participant terminal 30 to the conference server 10.

In this case, the conference server 10 may receive an input of a comment from the participant by setting the field of comment 2531 in the reaction display area 253 to a state in which an input is possible. Specifically, when a type of response is transmitted from the participant terminal 30, the conference server 10 makes a display to reflect the type of response transmitted from the participant terminal 30 in the field of type 2530 of the reaction display area 253. The position at which the display is made is a place corresponding to the reproduction time of the clicked image. The conference server 10 receives an input of a comment from the participant by setting the field of comment 2531 displayed to reflect the type of response to a state in which an input is possible. The participant performs an operation of inputting a comment to the field of comment 2531 and finally performs a transmitting operation. Accordingly, the comment is transmitted from the participant terminal 30 to the conference server 10.

The conference server 10 generates reaction information on the basis of the type of response and the comment transmitted from the participant terminal 30. When the clicked position is in the conference video display area 250, the conference server 10 generates reaction information on the basis of the type of response and the comment transmitted from the participant terminal 30. When the clicked position is in the speech text display area 251, the conference server 10 generates reaction information on the basis of the type of response and the comment transmitted from the participant terminal 30.

The conference server 10 updates a displayed image (Step S14). Specifically, the conference server 10 generates a reaction image on the basis of the generated reaction information and delivers the generated reaction image to the speaker terminal 20 and the participant terminal 30.

When the conference video reaction information 122 is generated, the conference server 10 displays a reaction icon R in the conference video display area 250. Specifically, the conference server 10 prepares a reaction icon R indicating a "type of response" of the conference video reaction information 122. The conference server 10 displays the generated reaction icon R at a position of "coordinates" of the conference video reaction information 122 in an image of the conference video with "time" of the conference video reaction information 122 as a reproduction time. The conference server 10 adds a response to the reaction display area 253. Specifically, the conference server 10 displays the "type of response" and the "comment" of the conference video reaction information 122 at a position corresponding to the "time" of the conference video reaction information 122 in the reaction display area 253. In this way, the conference server 10 generates a reaction image.

When the speech text reaction information 123 is generated, the conference server 10 displays a reaction icon R in the speech text display area 251. Specifically, the conference server 10 prepares a reaction icon R indicating the "type of response" of the speech text reaction information 123. The conference server 10 displays the generated reaction icon R to correspond to a character string of the "position" of the speech text reaction information 123 in the speech text corresponding to the image of the conference video with the "time" of the speech text reaction information 123 as a reproduction time. The conference server 10 adds a response to the reaction display area 253. Specifically, the conference server 10 displays the "type of response" and the "comment" of the speech text reaction information 123 at a position corresponding to the "time" of the speech text reaction information 123 in the reaction display area 253. In this way, the conference server 10 generates the reaction image.

On the other hand, when it is determined in Step S12 that the clicked position is not a reaction-possible position, the conference server 10 determines whether the clicked position is a position of the consent button R12 in the reaction icon R (Step S15). When the clicked position is the position of the consent button R12, the conference server 10 identifies the reaction icon R corresponding to the clicked consent button 257. The conference server 10 displays a numerical value by incrementing the number set in the consent count R11 in the identified reaction icon R. In this way, the conference server 10 generates the reaction image. Then, the conference server 10 performs the process of Step S14.

The flow illustrated in FIG. 14 will be described below. The conference server 10 determines whether the reaction display area 253 of the participant terminal 30 has been clicked (Step S20). When the reaction display area 253 has been clicked, the conference server 10 determines whether the clicked position is a reaction-possible position (Step S21). The reaction-possible position is, for example, a part in which the field of type 2530 or the field of comment 2531 is displayed in the reaction display area 253. When the clicked position is a reaction-possible position, the conference server 10 stops reproduction of the video in the participant terminal 30 (Step S22).

The conference server 10 displays the conference video and the speech text corresponding to the time based on the clicked position (Step S23). Specifically, the conference server 10 identifies an image of the conference video to which the participant has made a response on the basis of the clicked position. The conference server 10 identifies an image with the time displayed in the seek bar display area 252 corresponding to the clicked position as a reproduction time as an image of the conference video to which the participant has made a response. The conference server 10 displays the identified image of the conference video in the conference video display area 250. The conference server 10 displays the speech text corresponding to the image displayed in the conference video display area 250 in the speech text display area 251.

The conference server 10 determines whether the clicked position is the field of type 2530 (Step S24). When the clicked position is the field of type 2530, the conference server 10 displays a selection screen (a type selection screen) for selecting the type of response illustrated in the example of FIG. 11 on the participant terminal 30 having transmitted the clicking operation (Step S25). The participant performs an operation of selecting a type of response on the selection screen and performs a transmitting operation. Accordingly, the type of response is transmitted from the participant terminal 30 to the conference server 10. The conference server 10 receives an input of a comment from the participant by setting the field of comment 2531 to a state in which an input is possible. The participant performs an operation of inputting a comment to the field of comment 2531 and finally performs a transmitting operation. Accordingly, the comment is transmitted from the participant terminal 30 to the conference server 10.

The conference server 10 updates the displayed image (Step S26). Specifically, the conference server 10 generates reaction information on the basis of the type of response and the comment transmitted from the participant terminal 30. The method of generating the reaction information is the same as the method described above with reference to the flowchart of FIG. 13. The conference server 10 generates a reaction image on the basis of the prepared reaction information. The method of making a display with addition of a response to the reaction display area 253 on the basis of the reaction information is the same as the method described above with reference to the flowchart of FIG. 13. In this case, the conference server 10 may display the corresponding reaction icon R at a predetermined position in an image (an image indicating the conference video or the speech text) corresponding to the reproduction time.

On the other hand, when it is determined in Step S24 that the clicked position is not in the field of type 2530, the conference server 10 determines whether the clicked position is in the field of comment 2531 (Step S27). When the clicked position is in the field of type 2530, the conference server 10 receives an input of a comment form the participant by setting the field of comment 2531 to a state in which an input is possible (Step S28). Then, the conference server 10 performs the process of Step S26.

An example in which the participant terminal 30 makes a response to speech details performed by the speaker terminal 20 has been described above. However, the present invention is not limited thereto. The speaker terminal 20 may make a response. An example in which the conference server 10 generates and transmits a reaction image has been described above. However, the present invention is not limited thereto. The conference server 10 may generate and transmit information for generating a reaction image (reaction information), and the speaker terminal 20 and the participant terminal 30 may generate the reaction image. In this case, the delivery video generating unit 131 generates information for generating the reaction image (reaction information). The delivery unit 132 transmits the reaction information along with the delivery image to the speaker terminal 20 and the participant terminal 30. The speaker terminal 20 and the participant terminal 30 generate a reaction image on the basis of the reaction information. The speaker terminal 20 and the participant terminal 30 generates the reaction image, for example, by displaying a reaction icon R indicated by the reaction information to overlap the delivery image.

An example in which the conference video and the speech text are delivered in the conference system 1 has been described above. However, the present invention is not limited thereto. In the conference system 1, an arbitrary video or a still image in addition to the conference video may be delivered and arbitrary text in addition to the speech text may be delivered. This system can be applied to when at least arbitrary content to which a response is made is delivered in the conference system 1. For example, this system can be applied when only an image is delivered in the conference system 1. This system can also be applied to only text is delivered in the conference system 1.

As described above, the conference server 10 according to the embodiment is a system that delivers a conference video or speech text (an example of first content) to the speaker terminal 20 and the participant terminal 30 (a plurality of information processing terminals). The conference server 10 includes the acquisition unit 130, the delivery video generating unit 131 (a generation unit), and the delivery unit 132. The acquisition unit 130 acquires information (response information) indicating a response of a participant to the conference video or the speech text from the participant terminal 30. The delivery video generating unit 131 generates reaction information on the basis of the response information. The reaction information is information in which the response of the participant is reflected in the conference video or the speech text. The delivery unit 132 delivers the reaction information or the conference video or the speech text (an example of second content) in which the reaction information is reflected to the speaker terminal 20 and the participant terminal 30.

The response information includes information indicating a reproduction time of the conference video or the speech text (an example of target content) to which a response has been made and a target (a response target) to which a response has been made. The reproduction time is information indicating an elapsed time from a start time of the conference video of the speech text. The delivery video generating unit 131 identifies the target content and the response target on the basis of the response information. The delivery video generating unit 131 generates information for reflecting a response in the reaction target in the identified target content as the reaction information. Accordingly, with the conference server 10 according to the embodiment, when a response to the delivered content has been made, it is possible to present a speaker and a participant to what target in the content corresponding to a certain reproduction time the response has been made. According, it is possible to accurately deliver a response.

The response information includes consent information (an example of information indicating a response to an existing response) to an existing response made already to the conference video or the speech text (an example of target content) to which a response is made. The delivery video generating unit 131 generates response information for reflecting the existing response and the response to the existing response in the target content as the reaction information. Accordingly, with the conference server 10 according to the embodiment, when a response to the delivered content has been made, it is possible to present a speaker and a participant what response to the response has been made. According, it is possible to accurately deliver a response.

The conference server 10 according to the embodiment delivers a conference video. The response information includes information indicating the reproduction time of the conference video to which a response has been made and position coordinates at which the response has been made. The delivery video generating unit 131 generates information for displaying a response at the position coordinates in the conference video (a target image) to which the response has been made as the reaction information. Accordingly, with the conference server 10 according to the embodiment, it is possible to present a speaker and a participant at what position in the image corresponding to a certain reproduction time the response has been made in the delivered conference video.

The conference server 10 according to the embodiment delivers speech text. The response information includes information indicating target text to which a response has bene made. The delivery video generating unit 131 generates information for displaying a response to correspond to the target text to which the response has been made as the reaction information. Accordingly, with the conference server 10 according to the embodiment, it is possible to present a speaker and a participant to what text part of the delivered speech text a response has been made.

An image including the conference video display area 250 or the speech text display area 251 and the reaction display area 253 is displayed on the speaker terminal 20 and the participant terminal 30. A conference video is displayed in the conference video display area 250. Speech text is displayed in the speech text display area 251. A response is displayed in the reaction display area 253. When a response has been made in the conference video display area 250, the delivery video generating unit 131 displays a reaction icon R at position coordinates at which a response has been made in the conference video to which the response has been made. When a response has been made in the speech text display area 251, the delivery video generating unit 131 displays a reaction icon R in correlation with a character string to which the response has been made. The delivery video generating unit 131 displays the character string indicating specific details of the response. Accordingly, with the conference server 10 according to the embodiment, it is possible to simply display to what part of the conference video or the speech text a response has been made by expressing a target to which the response has been made using an icon image. By displaying a character string in the reaction display area 253, it is possible to allow details of the response to be easily ascertained.

The reaction icon R is an example of "information for displaying a response." The character string displayed in the reaction display area 253 is an example of "information for displaying a response."

The delivery video generating unit 131 displays a reaction icon R indicating a type of response. The information indicating a type of response is an example of "type information." Accordingly, with the conference server 10 according to the embodiment, it is possible to apparently display a type of response using the icon image.

The delivery video generating unit 131 displays a reaction icon R indicating a degree of consent to an existing response. Accordingly, with the conference server 10 according to the embodiment, it is possible to apparently display to what extent the existing response is supported using the icon image.

Modified Example of First Embodiment

A modified example of the first embodiment will be described below. This modified example is different from the embodiment in that a response is requested. This modified example can be applied, for example, when a questionnaire about announced details is provided.

Figure 15:
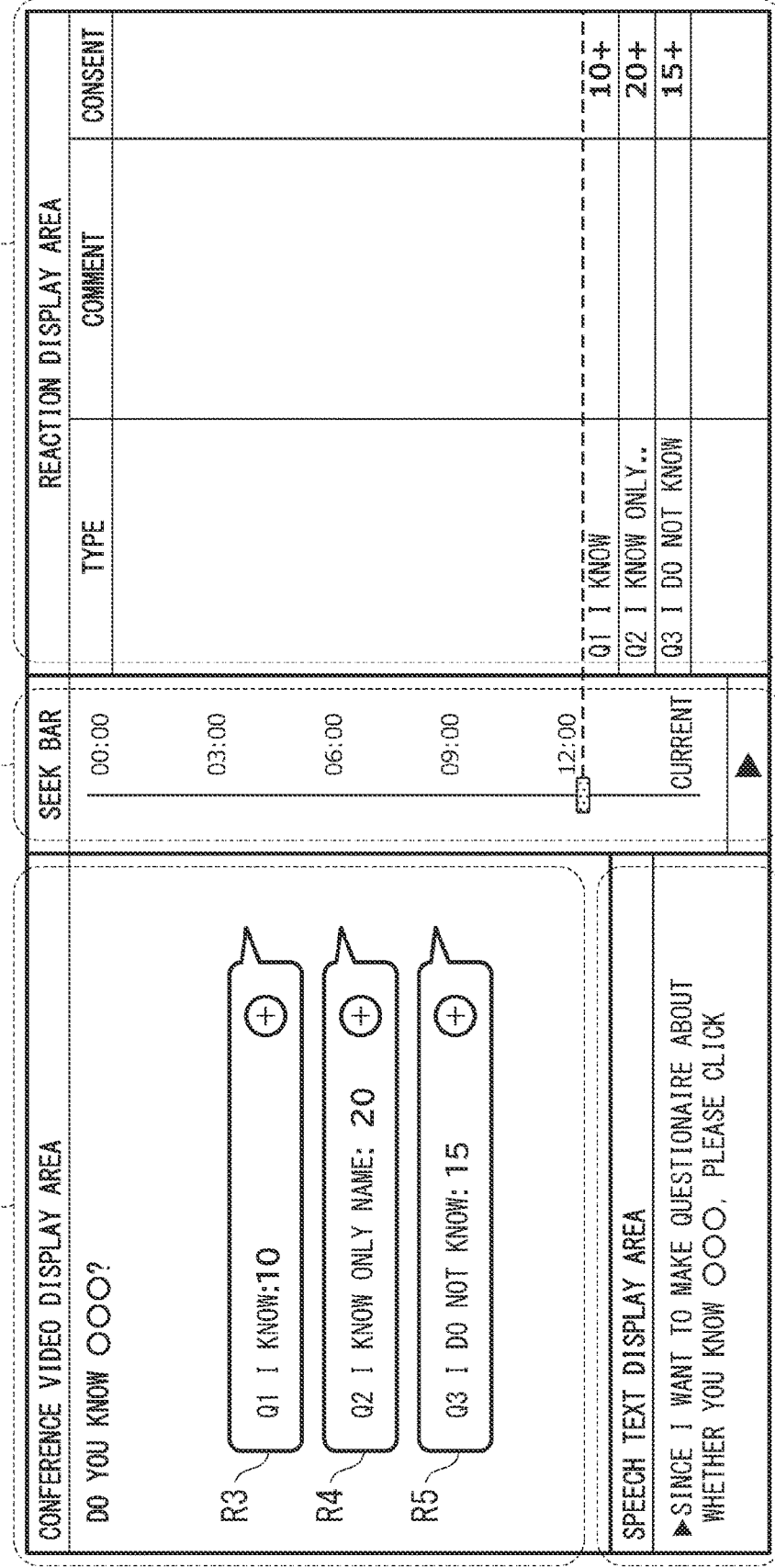
FIG. 15 is a diagram illustrating an example of an image which is displayed on a display unit 25 according to a modified example of the first embodiment.
Figures 16, 17:
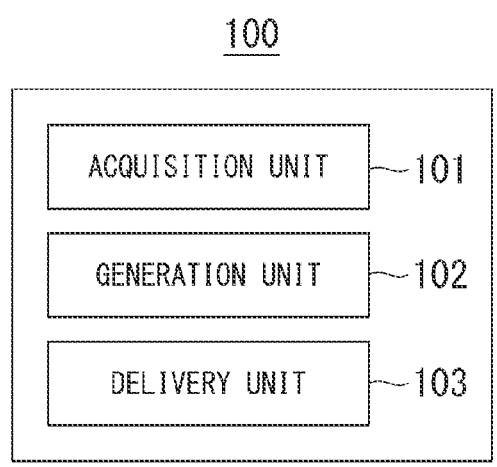
FIG. 16 is a diagram illustrating an example of an image which is displayed on a display unit 25 according to a modified example of the first embodiment.
FIG. 17 is a block diagram illustrating an example of a configuration of a conference system 100 according to a second embodiment.

FIGS. 15 and 16 are diagrams illustrating an example of an image which his displayed on a display unit 25 according to a modified example of the first embodiment. FIG. 15 illustrates an example of a setting image (a questionnaire editor in the example illustrated in the drawing) which is displayed on a speaker terminal 20 (or a participant terminal 30) of a requester requesting a response. As illustrated in FIG. 15, the questionnaire editor includes a field for inputting questionnaire details. The requester inputs desired details of a questionnaire, that is, desired details of a question, to the field for inputting questionnaire details. The requester ascertains the input details and then clicks a paste button. Accordingly, a reaction icon R indicating details of the questionnaire are displayed in the conference video display area 250. For example, a questionnaire is carried out by displaying the reaction icon R indicating details of the questionnaire along with a question "Do you know . . . ?" in the conference video display area 250. In this case, when a speaker has spoken carrying-out of the questionnaire, the spoken details are converted to text and displayed in the speech text display area 251. Then, the details of the questionnaire are displayed in the reaction display area 253.

A questionnaire answerer clicks the consent button R12 in a return reaction icon R in the reaction icon R displayed in the conference video display area 250. Accordingly, an answer to the questionnaire is delivered to the conference server 10. The conference server 10 updates the numerical value displayed in the consent count R11 of the reaction icon R on the basis of the delivered answer to the questionnaire. The conference server 10 updates the field of consent 2532 in the reaction display area 253.

As described above, in the conference server 10 according to the modified example of the first embodiment, the response information includes an answer to a question, and the delivery video generating unit 131 generates information for generating an image in which the question and a degree of consent to the question are displayed in the delivery image as the reaction information. Accordingly, with the conference server 10 according to the modified example of the embodiment, it is possible to ascertain to what extent a question is supported.

Second Embodiment

A second embodiment will be described below. FIG. 17 is a block diagram illustrating an example of a configuration of a conference system 100 according to the second embodiment. As illustrated in FIG. 17, the conference system 100 includes an acquisition unit 101, a delivery video generating unit 102, and a delivery unit 103. The acquisition unit 101 acquires information indicating a response of a participant (response information) from the participant terminal 30. The delivery video generating unit 102 generates reaction information on the basis of the information (response information) indicating the response of the participant. The delivery unit 103 delivers the reaction information or a reaction image to the speaker terminal 20 and the participant terminal 30.

A program for realizing some or all functions of the conference system 1 (100) and the conference server 10 according to the present invention may be recorded on a computer-readable recording medium, and the program recorded on the recording medium may be read and executed by a computer system to control a process of curbing display unevenness. The "computer system" mentioned herein may include an operating system (OS) or hardware such as peripherals. The "computer system" includes a WWW system including a homepage provision environment (or display environment). Examples of the "computer-readable recording medium" include a portable medium such as a flexible disk, a magneto-optical disc, a ROM, or a CD-ROM and a storage device such as a hard disk incorporated into a computer system. The "computer-readable recording medium" may include a medium that holds a program for a predetermined time such as volatile memory (RAM) in a computer system serving as a server or client when a program is transmitted via a network such as the Internet or a communication line such as a telephone line.

The program may be transmitted from a computer system storing the program in a storage device or the like to another computer system via a transmission medium or using carrier waves in the transmission medium. The "transmission medium" for transmitting a program is a medium having a function of transmitting information such as a network (a communication network) such as the Internet or a communication circuit (a communication line) such as a telephone circuit. The program may realize some of the aforementioned functions. The program may be a so-called differential file (a differential program) which can realize the aforementioned functions in combination with another program stored in advance in the computer system.

While embodiments of the present invention have been described above in detail with reference to the drawings, a specific configuration is not limited to the embodiments and includes modifications in design or the like without departing from the gist of the present invention.

INDUSTRIAL APPLICABILITY

The aforementioned conference system can be applied to a communication tool that delivers an image to a plurality of information processing terminals connected online and enables sharing of a response to the delivered image. Particularly, the conference system is suitable for applications for speaking while ascertaining responses of participants such as conferences or seminars which are held online.

REFERENCE SIGNS LIST 1, 100 . . . Conference system
10 . . . Conference server (delivery server)
20 . . . Speaker terminal (information processing terminal)
30 . . . Participant terminal (information processing terminal)
130 . . . Acquisition unit
131 . . . Delivery video generating unit (generation unit)
132 . . . Delivery unit

What is claimed is:

1. A delivery server device delivering first content to a plurality of information processing terminals, the delivery server device being connectable via a network to a participant terminal, the delivery server device comprising:
a hardware processor;
a memory that stores a set of processor executable programs that, when executed, causes the hardware processor to perform:
acquiring response information indicating a response to the first content from the plurality of information processing terminals, wherein the response information includes information indicating a reproduction time of target content to which the response has been made in the first content and a response target to which the response has been made in the target content;
identifying the target content and the response target on a basis of the response information;
generating information for reflecting the response in a reaction target in the identified target content as a reaction information;
delivering the reaction information or second content in which the reaction information is reflected in the first content to the plurality of information processing terminals;
wherein the hardware processor is caused to further perform:
determining whether there has been clicked a conference video display area or a speech text display area of the participant terminal to which the delivery server device being connectable via a network;
stopping reproduction of a video in the participant terminal if the conference video display area or the speech text display area has been clicked;
generating reaction information that is a conference video reaction information or a speech text reaction information;
displaying a selection screen on the participant terminal as a response to the clicking operation to allow a participant to select a type of response on the selection screen;
receiving a notification of the type of response selected, from the participant terminal;
making, on the participant terminal, a display that reflects the type of response selected, in a field of type of the reaction display area;
setting a field of comment in the display on the participant terminal to allow the participant to input a comment in the field of comment;
receiving the comment from the participant terminal;
generating reaction information on a basis of the type of response and the comment;
generating a reaction image on the basis of the reaction information generated; and
delivering the reaction image to a speaker terminal and the participant terminal.

2. A delivery server device delivering first content to a plurality of information processing terminals, the delivery server device being connectable via a network to a participant terminal, the delivery server device comprising:
a hardware processor;
a memory that stores a set of processor executable programs that, when executed, causes the hardware processor to perform:
acquiring response information indicating a response to the first content from the plurality of information processing terminals, wherein the response information includes information indicating a response to an existing response already made to target content to which the response has been made in the first content;
identifying the target content and the response target on a basis of the response information;
generating information for reflecting the existing response and the response to the existing response in the target content as a reaction information;
delivering the reaction information or second content in which the reaction information is reflected in the first content to the plurality of information processing terminals;
wherein the hardware processor is caused to further perform:
determining whether there has been clicked a conference video display area or a speech text display area of the participant terminal to which the delivery server device being connectable via a network;
stopping reproduction of a video in the participant terminal if the conference video display area or the speech text display area has been clicked;
generating reaction information that is a conference video reaction information or a speech text reaction information;
displaying a selection screen on the participant terminal as a response to the clicking operation to allow a participant to select a type of response on the selection screen;
receiving a notification of the type of response selected, from the participant terminal;
making, on the participant terminal, a display that reflects the type of response selected, in a field of type of the reaction display area;
setting a field of comment in the display on the participant terminal to allow the participant to input a comment in the field of comment;
receiving the comment from the participant terminal;
generating reaction information on a basis of the type of response and the comment;
generating a reaction image on a basis of the reaction information generated; and
delivering the reaction image to a speaker terminal and the participant terminal.

3. The delivery server device according to claim 1, wherein the first content is a moving image,
wherein the response information includes information indicating a reproduction time of a target image to which the response has been made in the moving image and position coordinates at which a target of the response is present in the target image, and
wherein identifying the target content and the response target further comprises identifying the target image and the position coordinates on the basis of the response information and generating information for displaying the response at the position coordinates in the identified target image as the reaction information.

4. The delivery server device according to claim 1, wherein the first content is speech text indicating a character string in which uttered speech is converted to text,
wherein the response information includes information indicating target text to which the response has been made in the speech text, and
wherein generating information for displaying the response information includes generating information for displaying the response information for displaying the response information for displaying the response to correspond to the target text as the reaction information.

5. The delivery server device according to claim 1, wherein an image including a content display area in which the first content is displayed and a reaction display area in which the response is displayed is displayed on the plurality of information processing terminals, and
wherein the hardware processor is caused to further perform:
generating information for displaying an icon image indicating the response in the content display area and displaying a character string indicating the response in the reaction display area as the reaction information.

6. The delivery server device according to claim 5, wherein the response information includes type information indicating a type of the response, and
wherein generating information for displaying the icon image includes generating information for displaying the icon image indicating the type of the response as the reaction information on the basis of the type information.

7. The delivery server device according to claim 5, wherein the response information includes consent information indicating whether to consent to an existing response already made to the first content, and
wherein generating information for displaying the icon image includes generating information for displaying the icon image indicating a degree of consent to the existing response as the reaction information on the basis of the consent information.

8. A delivery method that is performed by a delivery server device configured to deliver a first content to a plurality of information processing terminals, the delivery method comprising:
acquiring response information indicating a response to the first content from the plurality of information processing terminals, wherein the response information includes information indicating a reproduction time of target content to which the response has been made in the first content and a response target to which the response has been made in the target content;
identifying the target content and the response target on the basis of the response information;
generating information for reflecting the response in a reaction target in the identified target content as a reaction information;
delivering the reaction information or second content in which the reaction information is reflected in the first content to the plurality of information processing terminals;
determining whether there has been clicked a conference video display area or a speech text display area of the participant terminal to which the delivery server device being connectable via a network;
stopping reproduction of a video in the participant terminal if the conference video display area or the speech text display area has been clicked;
generating reaction information that is a conference video reaction information or a speech text reaction information;
displaying a selection screen on the participant terminal as a response to the clicking operation to allow a participant to select a type of response on the selection screen;
receiving a notification of the type of response selected, from the participant terminal;
making, on the participant terminal, a display that reflects the type of response selected, in a field of type of the reaction display area;
setting a field of comment in the display on the participant terminal to allow the participant to input a comment in the field of comment;
receiving the comment from the participant terminal;
generating reaction information on the basis of the type of response and the comment;
generating a reaction image on the basis of the reaction information generated; and
delivering the reaction image to a speaker terminal and the participant terminal.

9. A delivery method to deliver a first content to a plurality of information processing terminal devices, the delivery method comprising:
acquiring response information indicating a response to the first content from the plurality of information processing terminals, wherein the response information includes information indicating a response to an existing response already made to target content to which the response has been made in the first content;
identifying the target content and the response target on a basis of the response information;
generating information for reflecting the existing response and the response to the existing response in the target content as a reaction information;
delivering the reaction information or second content in which the reaction information is reflected in the first content to the plurality of information processing terminals;
determining whether there has been clicked a conference video display area or a speech text display area of the participant terminal to which the delivery server device being connectable via a network;
stopping reproduction of a video in the participant terminal if the conference video display area or the speech text display area has been clicked;
generating reaction information that is a conference video reaction information or a speech text reaction information;
displaying a selection screen on the participant terminal as a response to the clicking operation to allow a participant to select a type of response on the selection screen;
receiving a notification of the type of response selected, from the participant terminal;
making, on the participant terminal, a display that reflects the type of response selected, in a field of type of the reaction display area;
setting a field of comment in the display on the participant terminal to allow the participant to input a comment in the field of comment;
receiving the comment from the participant terminal;
generating reaction information on the basis of the type of response and the comment;
generating a reaction image on the basis of the reaction information generated; and
delivering the reaction image to a speaker terminal and the participant terminal.

* * * * *